(12) United States Patent
Sellappa et al.

(10) Patent No.: US 10,972,383 B2
(45) Date of Patent: Apr. 6, 2021

(54) METHOD AND SYSTEM FOR PROCESSING NETWORK TRAFFIC USING EXPANDED LABELS

(71) Applicant: Arista Networks, Inc., Santa Clara, CA (US)

(72) Inventors: Sriram Sellappa, Santa Clara, CA (US); Simon Liang, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 48 days.

(21) Appl. No.: 16/358,005

(22) Filed: Mar. 19, 2019

(65) Prior Publication Data

US 2020/0304404 A1   Sep. 24, 2020

(51) Int. Cl.
*H04L 12/723* (2013.01)
*H04L 12/715* (2013.01)
*H04L 12/805* (2013.01)
*H04L 12/911* (2013.01)

(52) U.S. Cl.
CPC ............ *H04L 45/507* (2013.01); *H04L 45/64* (2013.01); *H04L 47/36* (2013.01); *H04L 47/825* (2013.01)

(58) Field of Classification Search
CPC ...................................................... H04L 45/50
See application file for complete search history.

(56) References Cited

U.S. PATENT DOCUMENTS

| | | | | |
|---|---|---|---|---|
| 7,319,699 B1 * | 1/2008 | Provine | ............... | H04L 12/4633 370/395.3 |
| 2005/0165952 A1 * | 7/2005 | Anschutz | ............... | H04L 45/50 709/238 |
| 2006/0182127 A1 * | 8/2006 | Park | ......................... | H04L 45/50 370/400 |
| 2010/0040061 A1 * | 2/2010 | McGuire | ................. | H04L 45/00 370/392 |
| 2013/0163475 A1 * | 6/2013 | Beliveau | ............. | H04L 47/2441 370/257 |
| 2013/0287027 A1 * | 10/2013 | Ra | ......................... | H04L 45/745 370/392 |
| 2015/0003463 A1 | 1/2015 | Li | | |
| 2020/0287824 A1 * | 9/2020 | Dutta | ..................... | H04L 45/507 |
| 2020/0358698 A1 * | 11/2020 | Song | ....................... | H04L 69/22 |

FOREIGN PATENT DOCUMENTS

EP   3310010 A1   4/2018

OTHER PUBLICATIONS

Internation Search Report and Written Opinion issued in corresponding PCT Application No. PCT/US2020/015415, dated May 4, 2020 (15 pages).

* cited by examiner

*Primary Examiner* — Shukri Taha
(74) *Attorney, Agent, or Firm* — Chamberlain, Hrdlicka, White, Williams & Aughtry

(57) ABSTRACT

A method for managing traffic in a network. The method includes receiving an overlay frame comprising a header portion and obtaining, from the header portion, a first label and a second label. The method further includes generating an expanded label comprising the first label and the second label, making a first determination that an overlay network table comprises an entry for the expanded label, and based on the first determination, processing the overlay frame using the entry.

20 Claims, 5 Drawing Sheets

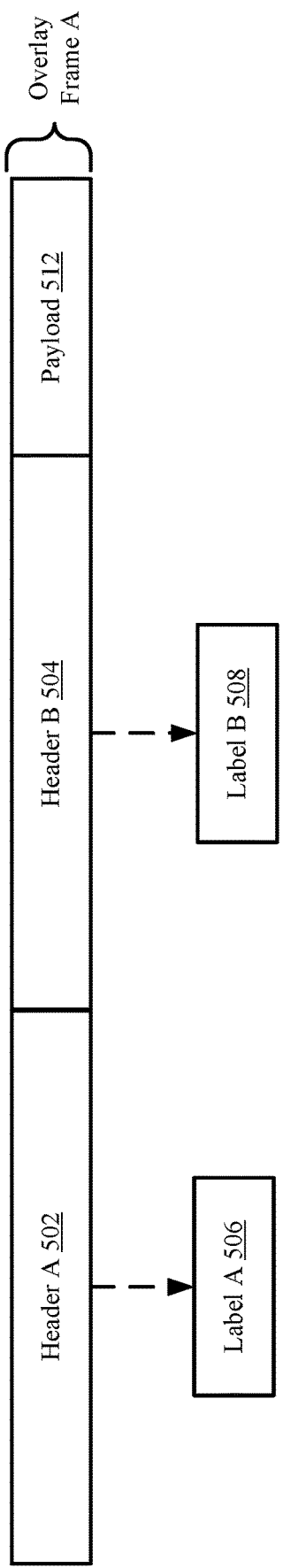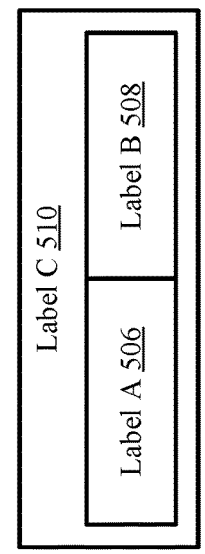
FIG. 5A
FIG. 5B

US 10,972,383 B2

METHOD AND SYSTEM FOR PROCESSING NETWORK TRAFFIC USING EXPANDED LABELS

BACKGROUND

Various mechanisms are used to route and/or forward traffic within a network. Network resources are required to implement these mechanisms. As the size and complexity of the network increases, the management resources and network resources required to implement the aforementioned mechanisms may limit the ability to scale the network effectively beyond a certain size.

SUMMARY

In general, in one aspect, the invention relates to a method for managing traffic in a network. The method includes receiving an overlay frame comprising a header portion, obtaining, from the header portion, a first label and a second label, generating an expanded label comprising the first label and the second label, making a first determination that an overlay network table comprises an entry for the expanded label, based on the first determination, processing the overlay frame using the entry.

In general, in one aspect, the invention relates to a non-transitory computer readable medium (CRM) comprising computer readable program code, which when executed by a processor, enables the processor to receive an overlay frame comprising a header portion, obtain, from the header portion, a first label and a second label, generate an expanded label comprising the first label and the second label, make a first determination that an overlay network table comprises an entry for the expanded label, and based on the first determination, processing the overlay frame using the entry.

In general, in one aspect, the invention relates to a network device, comprising a processor, persistent storage comprising computer readable program code, which when executed by the processor, enables the network device to: receive an overlay frame comprising a header portion, obtain, from the header portion, a first label and a second label, generate an expanded label comprising the first label and the second label, make a first determination that an overlay network table comprises an entry for the expanded label, and based on the first determination, processing the overlay frame using the entry.

Other aspects of the invention will be apparent from the following description and the appended claims.

BRIEF DESCRIPTION OF DRAWINGS

FIGS. 5A-5B show an example in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method, non-transitory, and network device for managing traffic in a network. More specifically, embodiments of the invention relate to managing traffic in an overlay network using labels of different sizes. Depending on the size of the overlay network, embodiments enable the use of different size labels to facilitate routing within the overlay network while at the same time not requiring any changes to the frame format. This provides, in various embodiments of the invention, a mechanism to enable the size of the overlay network to scale efficiently as the label sizes may be changed, as required, to enable routing in any size of overlay network.

Figure 1:
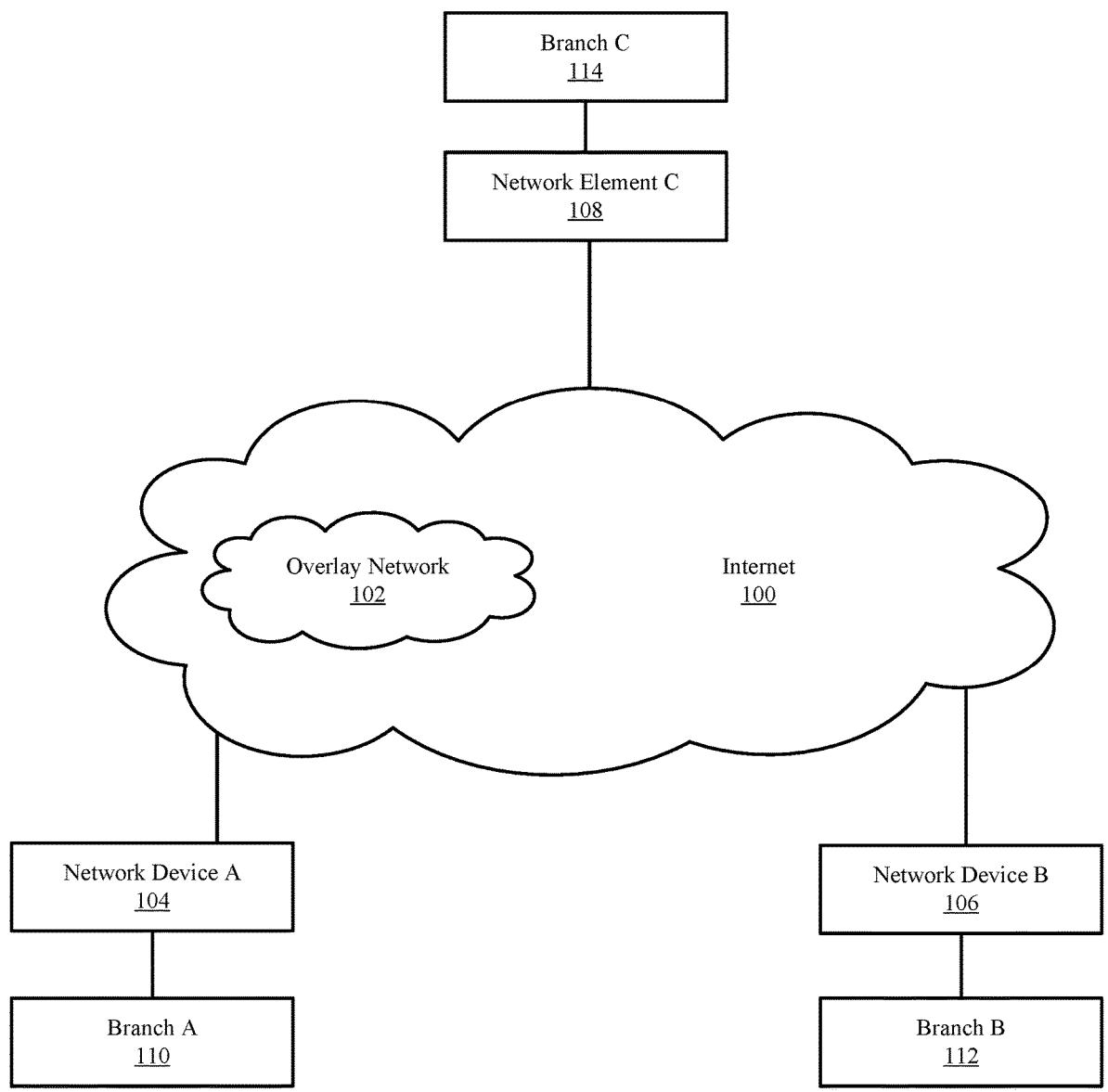
FIG. 1 shows a system in accordance with one or more embodiments of the invention.

FIG. 1 shows a system in accordance with one or more embodiments of the invention. The system includes one or more network devices (104, 106, 108) operatively connected through an overlay network (102), and multiple Internet (100) connections. The system further includes branches (110, 112, 114), each of which may be directly connected to one or more network devices (104, 106, 108). In one embodiment of the invention, a branch corresponds to a set of computing devices that are directly (or indirectly) connected to the network devices (104, 106, 108), where the computing devices in the branches communicate with each other via the overlay network. Additional details about the network elements (e.g., 104, 106 108) is described below in FIG. 2.

In one embodiment of the invention, the Overlay Network (102) may be a set of interconnected network devices or systems (not shown), which operatively connect the one or more network device(s) (104, 106, 108). The Overlay Network (102) includes functionality to facilitate communications between these aforementioned components using an overlay protocol (e.g. Multiprotocol Label Switching (MPLS)). Those skilled in the art will appreciate that other overlay protocols may be used without departing from the invention. The Overlay Network (102) may include any combination of local area network (LAN) and/or wide area network (WAN) segments, such as the Internet (100), which may employ any combination of wired and/or wireless connections and communication protocols.

While FIG. 1 shows a configuration of components, other system configurations may be used without departing from the scope of the invention.

Figure 2:
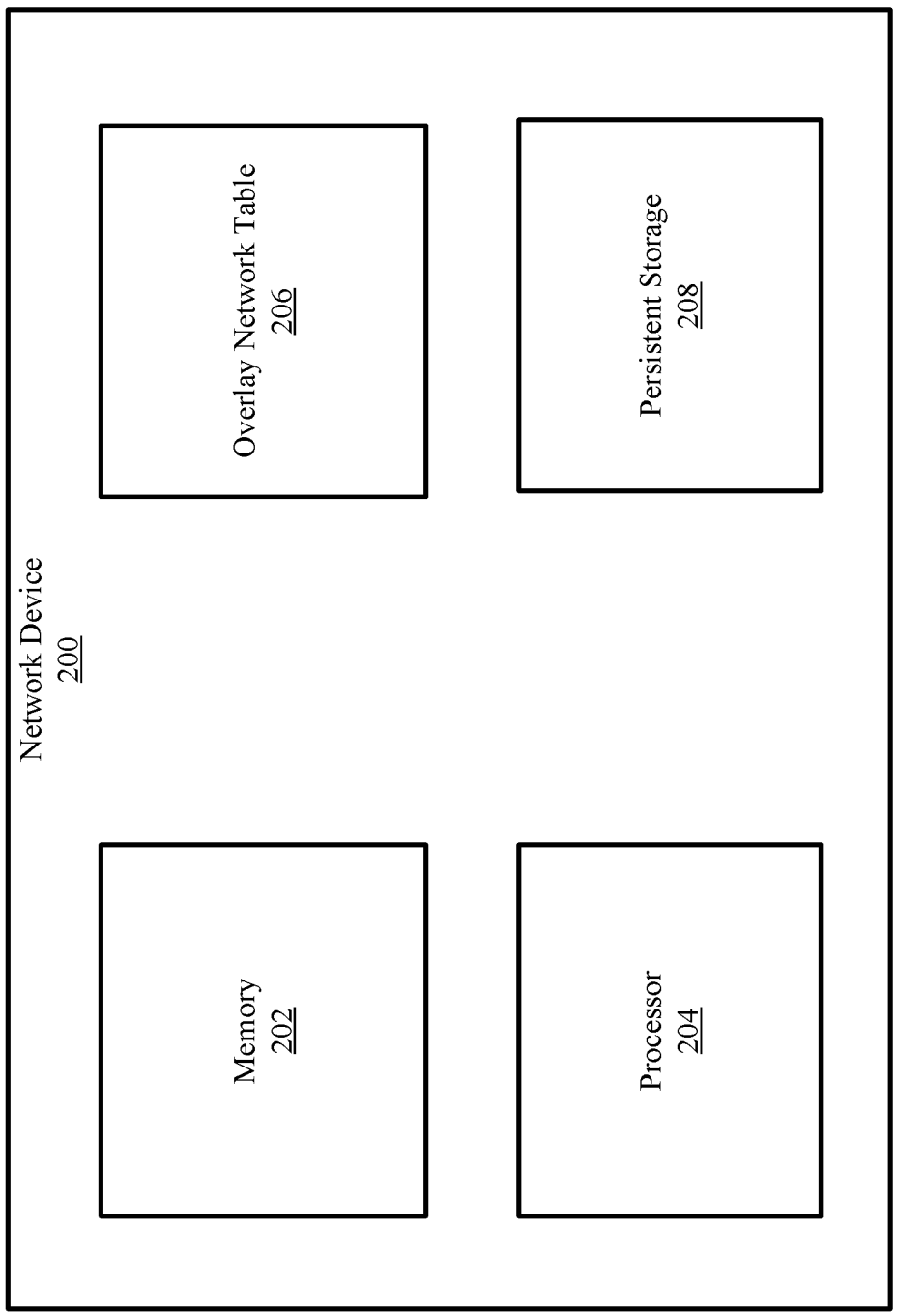
FIG. 2 shows a network device in accordance with one or more embodiments of the invention.

FIG. 2 shows a network device in accordance with one or more embodiments of the invention. The network device (200) may be a physical device that includes memory (202) (e.g., random access memory (RAM), shared memory), one or more processor(s) (204) (e.g., integrated circuits) (including a switch chip or network processor)), one or more overlay network tables (206), persistent storage (208), and two or more physical network interfaces or ports (not shown). The switch chip or network processor may be hardware that determines out of which egress port on the network device (200) to forward media access control (MAC) frames. The switch chip or network processor may include egress and ingress ports that may connect to the physical network interfaces or ports on the network device (200). Further, each physical network interface or port may or may not be connected to a branch, to another network device in the overlay network, or to other network components (not shown) in the overlay network or the Internet. A network device (200) may be configured to receive network packets (also referred to as packets or frames) via the network interfaces or ports, and determine whether to: (i) drop the network packet; (ii) process the network packet in accordance with one or more embodiments of the invention; and/or (iii) send the network packet, based on the processing, out another network interface or port on the network device (200) in accordance with one or more embodiments of the invention.

In one embodiment of the invention, the persistent storage (208) on a network device (200) may include any type of non-transitory computer readable medium that includes instructions, which, when executed by the one or more processor(s), enable the network device (200) to perform any of the functionalities described below in FIG. 4 and may also include functionality to implement an overlay protocol (e.g., MPLS). The functionality of the network device is not limited to the aforementioned examples. Examples of a network device (200) include, but are not limited to, a switch, a router, and a multilayer switch. A network device (200) is not limited to the aforementioned specific examples.

In one embodiment of the invention, the network device (200) includes one or more overlay network tables (206) for managing traffic in network. Each overlay table (206) includes entries, where each of the entries includes a label (or a value based or derived from a label) and a corresponding action.

In one embodiment of the invention, a label is an identifier of a network device in an overlay network. The label may be represented as an integer. Those skilled in the art will appreciate that the label may include any combination of numbers and letter and/or be in any format.

If the network device includes a single overlay network table, then the labels (or values based or derived from the labels) in the entries may be of different sizes. Alternatively, if the overlay network table has multiple overlay network tables, then the labels (or values based or derived from the labels) stored in any given overlay network table have the same size but different overlay network tables store different size labels (or values based or derived from the labels). For example, overlay network table A may have labels of a first size and overlay network table B may have labels of a different size. In another alternative, the network device may include multiple overlay network tables, each including entries with different size labels (or different sized values based or derived from the labels).

In one embodiment of the invention, an action corresponds to the action that should be performed on the overlay frame when the overlay frame includes a label that matches an entry in the overlay network table. The action may include, but are not limited to, modifying all or a portion of a header(s) in the overlay frame and/or transmitting the packet to another network device or branch (e.g., 110, 112, 114). The modification may include, but is not limited to, adding a label(s) to the overlay frame, deleting a label(s) from the overlay frame, and/or replacing a label(s) in the overlay frame.

Figure 3:
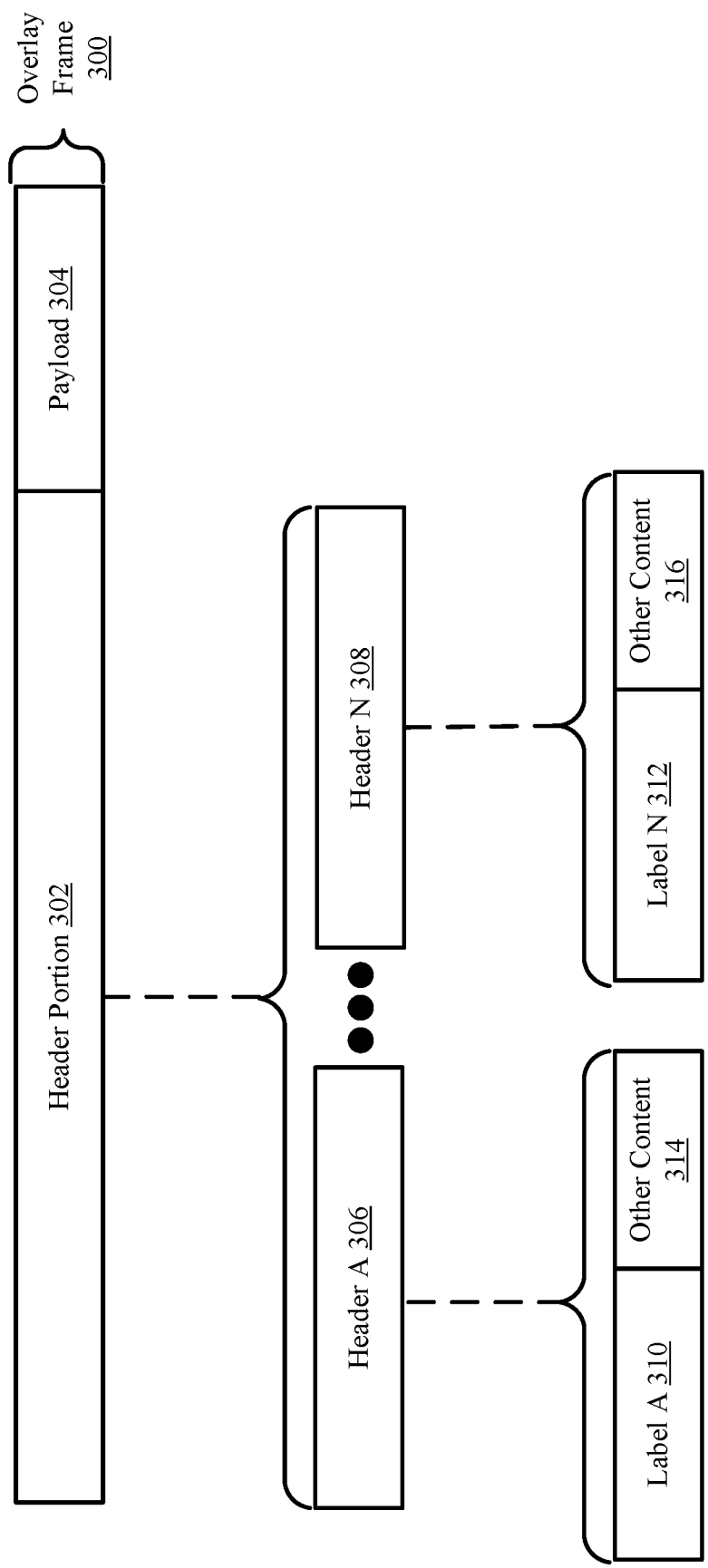
FIG. 3 shows an overlay frame in accordance with one or more embodiments of the invention.

FIG. 3 shows an overlay frame in accordance with one or more embodiments of the invention. The overlay frame (300) includes: (i) a header portion (302) and a payload (304). Each of the aforementioned components is described below. The overlay frame is generated by a network element.

In one embodiment of the invention, the header portion (302) may include one or more headers (e.g., header A (306), header N (308)). Each header includes a label (e.g., Label A (310), Label N (312)) and other content (e.g., 314, 316).

While the header portion may include any number of labels, the size of the headers and of the labels are the uniform within the overlay frame and amongst overlay frames. Said another way, the label and the header conform to the overlay protocol that is being used to process the overlay frames (e.g., MPLS protocol). While the headers, and ultimately the overlay frames, conform to the overlay protocol, the processing (described in FIG. 4) of the overlay frames allows labels that exceed the label size that can be stored in a single header to be used. In this manner, the labels that exceed the standard label size of the overlay protocol may be used. Labels that exceed the standard label size of the overlay protocol are referred to as expanded labels.

In scenarios in which the label size that is used by the overlay network exceeds the label size that is permitted by the overlay protocol, the label (which is an expanded label) may be split into multiple portions where each portion does not exceed label size permitted by the overlay protocol. For example, if the label has a size of 30 bits and the overlay protocol only allows for labels to have a size of 20 bits, then the 30-bit label may be split into a 20-bit label (i.e., label portion 1) and a 10-bit label (i.e., label portion 2). Because label portion 2 only includes 10 bits, an additional 20-bits of padding may be added to label portion 2 to generate a modified label portion 2.

The individual portions of the larger label (e.g., label portion 1 and label portion 2) are then stored in individual headers within the overlay frame. From the perspective of the overlay protocol, the header portion includes two headers each with a 20-bit label. However, as described below in FIG. 4, the multiple headers may be processed such that the individual label portions are combined to re-generate the larger label and then the larger label is processed using the overlay network table(s).

Continuing with the discussion of FIG. 3, the header packet may include other information/content without departing from the invention. In one embodiment of the invention, the payload (304) may include the content that is being transmitted in the overlay frame.

The overlay frame (300) may include other components without departing from the invention.

Figure 4:
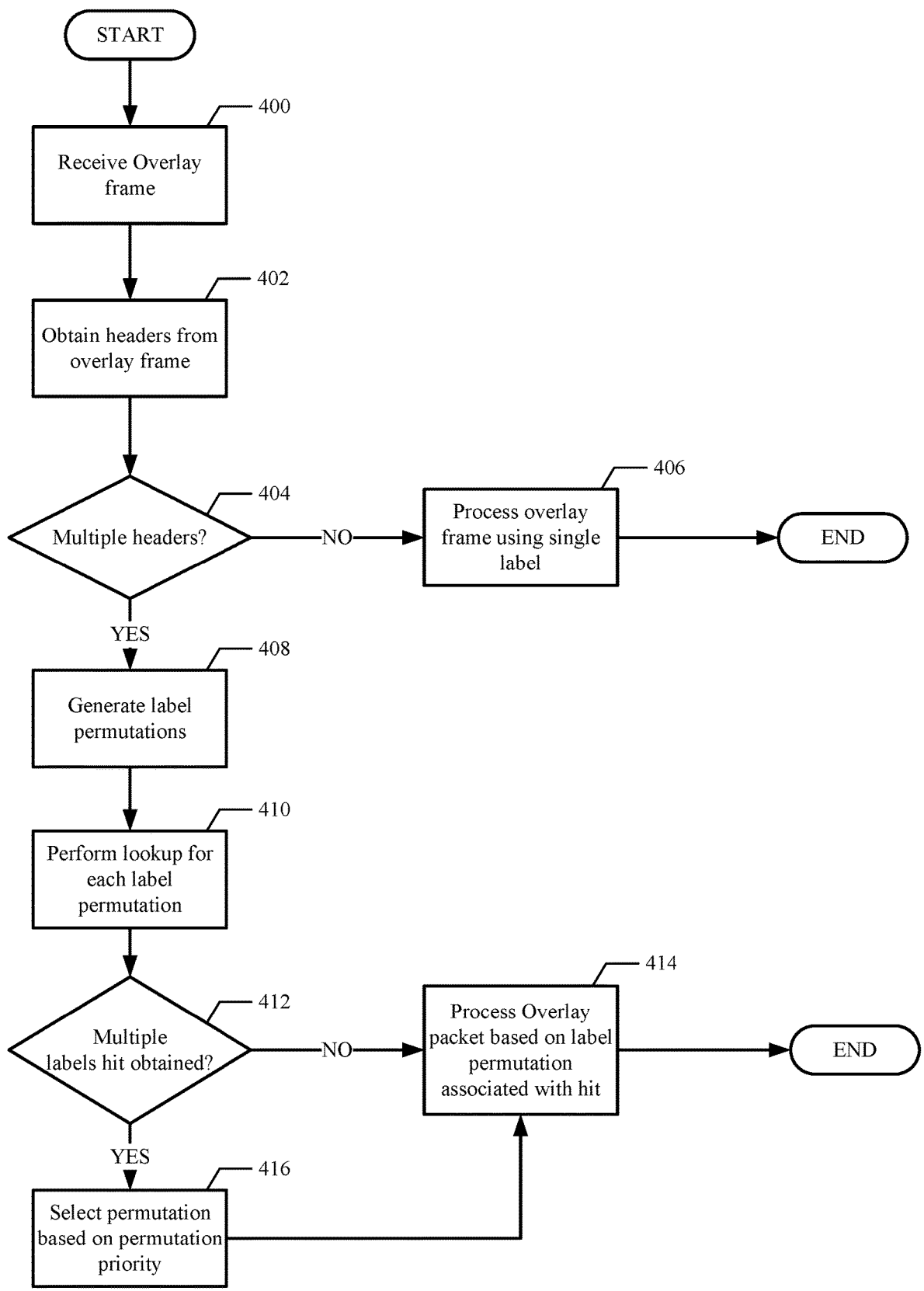
FIG. 4 shows a method for processing overlay frames by a network device in accordance with one or more embodiments of the invention.

FIG. 4 shows a flowchart in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 4 may be performed in parallel with any other steps shown in FIG. 4 without departing from the scope of the invention.

Turning to FIG. 4, FIG. 4 shows a method for processing overlay frames by a network device in accordance with one or more embodiments of the invention.

In step 400, an overlay frame is received by the network device. The overlay frame may include a header portion with one or more headers and a payload. Each header may include a label (as well as other content). The overlay frame may be a multi-label packet switched (MPLS) frame.

In step 402, the headers are obtained from the header portion. If there is only one header in the header portion then only one header is obtained in step 402; however, if there are multiple headers in the header portion, then each of the headers in the header portion is obtained.

In step 404, a determination is as to whether the header portion has multiple headers (i.e., where multiple headers identified and/or obtained/extracted from the header portion in step 402). If there are multiple headers, the process proceeds to step 408. However, if there are not multiple headers (i.e., there is only one header in the header portion of the overlay frame), then the process proceeds to step 406.

In step 406, the overlay frame is processed using a single label. The processing may include performing a lookup in an overlay network table using the single label (or a value based on or derived from the single label) to obtain an entry. The overlay frame may then be processed in accordance with the action specified in the entry. At this stage, the processing of the overlay frame is complete and the process ends.

Returning to step 404, if there is a determination that there are multiple headers, then in step 408, label permutations are generated. As discussed above, embodiments of the invention enable arbitrarily sized labels to be used without modifying the overlay protocol. Accordingly, when an overlay frame with multiple labels is obtained by the network element, the network element must determine whether the overlay frame includes labels that of the standard size or labels that are greater than the standard size (i.e., the size that is permitted by the overlay protocol). The generation of the label permutations enables the network device to make the aforementioned determination.

In one embodiment of the invention, label permutations include combining one or more of the labels (i.e., the label present in the headers of the overlay frame). As discussed above, a given header portion may include multiple labels and further the labels used in the header portion may not all be uniform in size. Further, for labels that are larger than the label size allowed by the overlay protocol, the labels are divided into label portions and then included within sequential headers in the overlay frame. Accordingly, when generating the label permutations, the ordering of the labels is maintained. Consider a scenario in which the header portion of the overlay frame include three labels: L1, L2, L3. The label permutations are as follows: Label Permutation 1: L1, Label Permutation 2: L1+L2, Label Permutation 3: L1+L2+ L3. Label Permutations 2 and 3 may be referred to as expanded labels. The invention is not limited to the aforementioned example.

Continuing with the discussion of FIG. 4, in step 410, a lookup is performed in the overlay network table(s) for each label permutation generated in step 408. The lookup may include, but is not limited to: (i) determining whether any overlay network table(s) includes an entry with the label permutation; or (ii) determining whether any overlay network table(s) includes an entry with a value that is based on or derived from the label permutation.

In step 412, a determination is made as to whether multiple label hits are obtained. The determination in 412 includes determining whether two or more entries in the overlay network table(s) were identified in step 410. If only one entry was identified, then the process proceeds to step 414; otherwise, the process proceeds to step 416.

In step 414, the overlay fame is processed based on the label permutation associated with the identified entry. More specifically, the overlay frame may be processed in accordance with the action specified in the identified entry. At this stage the processing of the overlay frame is complete and the process ends.

Returning to step 412, if multiple entries were identified in step 412, then in step 416, the label permutation is selected based on a permutation priority. In one embodiment of the invention, the permutation priority is used to determine which label permutation to process. The permutation priority may be, for example, that the largest label permutation has the highest priority. In another example, the smallest label permutation has the highest priority. The permutation priority may be set using any criterion or criteria without departing from the invention.

The following provides a non-limiting example of a permutation priority. Consider a scenario in which the header portion of the overlay frame include three labels: L1, L2, L3. The label permutations are as follows: Label Permutation 1: L1, Label Permutation 2: L1+L2, Label Permutation 3: L1+L2+L3. Further, in this example, assume that the Entry A was identified using the Label Permutation 1 and Entry B was identified using the Label Permutation 3. Finally, assume that the permutation priority sets the label permutation with the smallest size with the highest priority. Accordingly, because label permutation 3 has a larger size (i.e., L1+L2+L3) than label permutation 1 (i.e., L1), the overlay frame is processed using entry A. The invention is not limited to the aforementioned example.

Continuing with the discussion of FIG. 4, once the label permutation to use is selected based on the permutation priority, the process proceeds to step 414.

EXAMPLE

FIGS. 5A-5B show an example in accordance with one or more embodiments of the invention. The examples are not intended to limit the scope of the invention.

Consider a scenario in which in which an overlay frame is received wherein the overlay frame (500) includes: header A (502), header B (504) and a payload (512).

Based on the aforementioned information, label A (506) is obtained from header A (502) and label B (508) is obtained from header B (508), where header A and header B are in an ordered sequence within the header portion. In accordance with FIG. 4, label permutations are generated. The label permutations are label A (506) and an expanded label C (510), which is generated by concatenating the label A (506) and label B (508).

Scenario 1

A determination is made that an overlay network table includes an entry for the expanded label C (510) but no entry for Label A (506). Accordingly, the overlay frame is processed using the entry associated with expanded label C (510).

Scenario 2

A determination is made that an overlay network table includes an entry for the label A (506) but no entry for Label C (510). Accordingly, the overlay frame is processed using the entry associated with label A (506).

Scenario 3

A determination is made that an overlay network table includes a first entry for the label A (506) and a second entry for Label C (510). Because two entries were identified, a permutation priority is used to select one of the two entries. In this example, the permutation priority specifies that the largest label should be used. Accordingly, the entry associated with Label C (510) is used to process the overlay frame.

End of Example

One or more embodiments of the invention enable the implementation of an overlay network with an arbitrarily sized label by dividing the label between multiple headers that satisfy the overlay protocol and then using label permutations to determine the how to process the label. In this manner, the embodiments of the invention enable overlay protocols that currently exist (or that are developed in the future) with fixed label sizes to support arbitrarily size labels including labels that are significantly larger than the fixed label size supported by the overlay protocol.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing traffic in a network, comprising:
   receiving an overlay frame comprising a header portion;
   obtaining, from the header portion, a first standard size protocol label comprising a first label portion and a second standard size protocol label comprising a second label portion and a padding portion;
   identifying the second label portion within the second standard size protocol label;
   generating an expanded label comprising the first label portion and the second label portion;
   making a first determination that an overlay network table comprises an entry for the expanded label; and
   based on the first determination, processing the overlay frame using the entry.

2. The method of claim 1, further comprising:
   making a second determination that the overlay network table does not include any entries for the first label portion,
   wherein the processing of the overlay frame using the entry is further based on the second determination.

3. The method of claim 1, further comprising:
   making a second determination that the overlay network table includes a second entry for the first label portion; and
   based on the first and second determinations, making a third determination to process the overlay frame using the entry based on a permutation priority,
   wherein the processing of the overlay frame using the entry is further based on the second determination and the third determination.

4. The method of claim 1, further comprising:
   receiving a second overlay frame comprising a second header portion;
   obtaining, from the second header portion, a third label and a fourth label;
   generating a second expanded label comprising the third label and the fourth label;
   making a second determination that the overlay network table comprises a second entry for the third label;
   making a third determination that the overlay network table does not include any entries for the second expanded label; and
   based on the second determination and the third determination, processing the second overlay frame using the second entry.

5. The method of claim 1, wherein generating the expanded label comprises concatenating the first label portion and the second label portion.

6. The method of claim 1, wherein the first label portion and the second label portion are in an ordered sequence within the header portion and wherein the expanded label is generated based on the ordered sequence.

7. The method of claim 1, wherein the overlay frame is a multi-label packet switched (MPLS) frame.

8. A non-transitory computer readable medium (CRM) comprising computer readable program code, which when executed by a processor, enables the processor to:
   receive an overlay frame comprising a header portion;
   obtain, from the header portion, a first standard size protocol label comprising a first label portion and a second standard size protocol label comprising a second label portion and a padding portion;
   identify the second label portion within the second standard size protocol label;
   generate an expanded label comprising the first label portion and the second label portion;
   make a first determination that an overlay network table comprises an entry for the expanded label; and
   based on the first determination, processing the overlay frame using the entry.

9. The non-transitory CRM of claim 8, further comprising additional computer readable program code, which when executed by the processor, further enables the processor to:
   make a second determination that the overlay network table does not include any entries for the first label portion,
   wherein the processing of the overlay frame using the entry is further based on the second determination.

10. The non-transitory CRM of claim 8, further comprising additional computer readable program code, which when executed by the processor, further enables the processor to:
    make a second determination that the overlay network table includes a second entry for the first label portion; and
    based on the first and second determinations, make a third determination to process the overlay frame using the entry based on a permutation priority,
    wherein the processing of the overlay frame using the entry is further based on the second determination and the third determination.

11. The non-transitory CRM of claim 8, further comprising additional computer readable program code, which when executed by the processor, further enables the processor to:

receive a second overlay frame comprising a second header portion;

obtain, from the second header portion, a third label and a fourth label;

generate a second expanded label comprising the third label and the fourth label;

make a second determination that the overlay network table comprises a second entry for the third label;

make a third determination that the overlay network table does not include any entries for the second expanded label; and based on the second determination and the third determination, process the second overlay frame using the second entry.

12. The non-transitory CRM of claim 8, wherein generating the expanded label comprises concatenating the first label portion and the second label portion.

13. The non-transitory CRM of claim 8, wherein the first label portion and the second label portion are in an ordered sequence within the header portion and wherein the expanded label is generated based on the ordered sequence.

14. The non-transitory CRM of claim 8, wherein the overlay frame is a multi-label packet switched (MPLS) frame.

15. A network device, comprising:
a processor; and
persistent storage comprising computer readable program code, which when executed by the processor, enables the network device to:
receive an overlay frame comprising a header portion;
obtain, from the header portion, a first standard size protocol label comprising a first label portion and a second standard size protocol label comprising a second label portion and a padding portion;
identify the second label portion within the second standard size protocol label;
generate an expanded label comprising the first label portion and the second label portion;
make a first determination that an overlay network table comprises an entry for the expanded label; and
based on the first determination, processing the overlay frame using the entry.

16. The network device of claim 15, wherein the first label portion and the second label portion are in an ordered sequence within the header portion and wherein the expanded label is generated based on the ordered sequence.

17. The method of claim 1, wherein generating the expanded label further comprises discarding the padding portion of the second standard size protocol label.

18. The method of claim 1, further comprising:
receiving a second overlay frame comprising a second header portion;
obtaining, from the header portion, a third standard size protocol label comprising a third label portion, a fourth standard size protocol label comprising a fourth label portion, and a fifth standard size protocol label comprising a fifth label portion;
generating a first label permutation comprising the third label portion;
generating a second label permutation comprising the third label portion and the fourth label portion, wherein the second label permutation is a second expanded label;
generating a third label permutation comprising the third label portion, the fourth label portion, and the fifth label portion, wherein the third label permutation is a third expanded label;
making a second determination that the overlay network table comprises a second entry for the first label permutation, a third entry for the second label permutation, and a fourth entry for the third label permutation;
making a third determination, based on the second determination, that the second permutation has a highest permutation priority; and
processing, based on the third determination, the overlay frame using the third entry.

19. The non-transitory CRM of claim 8, wherein, to generate the expanded label, the non-transitory CRM further comprises additional computer readable program code, which when executed by the processor, further enables the processor to discard the padding portion of the second standard size protocol label.

20. The non-transitory CRM of claim 8, further comprising additional computer readable program code, which when executed by the processor, further enables the processor to:
receive a second overlay frame comprising a second header portion;
obtain, from the header portion, a third standard size protocol label comprising a third label portion, a fourth standard size protocol label comprising a fourth label portion, and a fifth standard size protocol label comprising a fifth label portion;
generate a first label permutation comprising the third label portion;
generate a second label permutation comprising the third label portion and the fourth label portion, wherein the second label permutation is a second expanded label;
generate a third label permutation comprising the third label portion, the fourth label portion, and the fifth label portion, wherein the third label permutation is a third expanded label;
make a second determination that the overlay network table comprises a second entry for the first label permutation, a third entry for the second label permutation, and a fourth entry for the third label permutation;
make a third determination, based on the second determination, that the second permutation has a highest permutation priority; and
process, based on the third determination, the overlay frame using the third entry.

* * * * *